(12) United States Patent
Silva et al.

(10) Patent No.: US 12,211,379 B2
(45) Date of Patent: Jan. 28, 2025

(54) TRANSPORTATION ENVIRONMENT DATA SERVICE

(71) Applicant: Intel Corporation, Santa Clara, CA (US)

(72) Inventors: Andradige Silva, Portland, OR (US); Kathiravetpillai Sivanesan, Portland, OR (US); Suman A. Sehra, Folsom, CA (US); Leonardo Gomes Baltar, Munich (DE)

(73) Assignee: Intel Corporation, Santa Clara, CA (US)

( * ) Notice: Subject to any disclaimer, the term of this patent is extended or adjusted under 35 U.S.C. 154(b) by 887 days.

(21) Appl. No.: 17/132,371

(22) Filed: Dec. 23, 2020

(65) Prior Publication Data

US 2021/0110713 A1    Apr. 15, 2021

(51) Int. Cl.
  *G08G 1/0962* (2006.01)
  *G06F 9/54* (2006.01)
  (Continued)

(52) U.S. Cl.
  CPC ......... *G08G 1/09623* (2013.01); *G06F 9/542* (2013.01); *G06F 9/547* (2013.01);
  (Continued)

(58) Field of Classification Search
  CPC ....... B60W 40/02; G01C 21/32; G05B 17/02; G05D 1/0088; G06F 3/017; G06F 9/5072;
  (Continued)

(56) References Cited

U.S. PATENT DOCUMENTS

2018/0174446 A1*  6/2018  Wang .............. G08G 1/096716
2019/0034235 A1    1/2019  Yang et al.
(Continued)

FOREIGN PATENT DOCUMENTS

WO    2018001444    1/2018

OTHER PUBLICATIONS

"European Application Serial No. 21209127.6, Response filed Dec. 19, 2022 to Extended European Search Report mailed May 23, 2022", 12 pgs.
(Continued)

*Primary Examiner* — Stephen R Burgdorf
(74) *Attorney, Agent, or Firm* — Schwegman Lundberg & Woessner, P.A.

(57) ABSTRACT

Disclosed are embodiments that provide a transportation environment data service. The transportation environmental data service includes harvesting services that crawl roadside infrastructure solutions to obtain sensor data collected from sensors physically positioned at the roadside infrastructure. In some cases, the roadside infrastructure solutions perform additional processing on the sensor data. For example, some roadside infrastructure performs object detection and/or object recognition. When encountering these solutions, the edge or harvesting service also collects the object detection and/or object recognition information. Customers can subscribe to various data services provided by the transportation environment data service. For example, some subscribers indicate an interest in any updates of environmental data for a particular region. Other subscribers are interested in video data associated with any vehicular accidents detected by the transportation environment data service.

15 Claims, 7 Drawing Sheets

(51) Int. Cl.
*G06N 5/04* (2023.01)
*G06N 20/00* (2019.01)
*G08G 1/0967* (2006.01)
*H04L 67/12* (2022.01)

(52) U.S. Cl.
CPC .............. *G06N 5/04* (2013.01); *G06N 20/00* (2019.01); *G08G 1/096766* (2013.01); *H04L 67/12* (2013.01)

(58) Field of Classification Search
CPC ...... G06F 9/542; G06F 9/547; G06F 16/2219; G06F 18/214; G06F 21/44; G06F 30/37; G06N 5/04; G06N 20/00; G06Q 40/08; G06V 10/82; G07C 5/008; G08G 1/0112; G08G 1/0116; G08G 1/0129; G08G 1/0133; G08G 1/0141; G08G 1/0175; G08G 1/09623; G08G 1/096716; G08G 1/096741; G08G 1/096766; G08G 1/096775; H04L 67/12; H04W 4/021; H04W 4/046; H04W 4/06; H04W 4/40; H04W 4/44; H04W 24/04
USPC ........................................................ 340/905
See application file for complete search history.

(56) References Cited

U.S. PATENT DOCUMENTS

| | | | |
|---|---|---|---|
| 2019/0132709 A1* | 5/2019 | Graefe | G05D 1/028 |
| 2020/0017117 A1 | 1/2020 | Milton | |
| 2020/0020227 A1 | 1/2020 | Ran et al. | |
| 2021/0035443 A1* | 2/2021 | Young | G08G 1/0145 |
| 2021/0110170 A1* | 4/2021 | Geissler | G06N 5/046 |
| 2021/0112441 A1* | 4/2021 | Sabella | H04W 4/38 |
| 2021/0241624 A1* | 8/2021 | Kan | G07C 5/085 |
| 2022/0388505 A1* | 12/2022 | Sharma Banjade | G08G 1/164 |
| 2023/0251656 A1* | 8/2023 | Trofymov | G05D 1/024 701/27 |

OTHER PUBLICATIONS

"AI Training Dataset Market Size Worth $4.8 Billion by 2027 | CAGR: 22.5%: Grand View Research, Inc.", Grand View Research, (May 26, 2020), 5 pgs.

"OpenVino For SmartCity", https: web.archive.org web 20201025231658 https: github.com incluit OpenVino-For-SmartCity, (Oct. 25, 2020), 18 pgs.

"European Application Serial No. 21209127.6, Extended European Search Report mailed May 23, 2022", 8 pgs.

\* cited by examiner

TRANSPORTATION ENVIRONMENT DATA SERVICE

TECHNICAL FIELD

The present disclosure relates to data services for transportation environments. In particular, at least some of the disclosed embodiments that implement a transportation environment data service.

BACKGROUND

Intelligent transportation solutions, advanced driving assistance systems (ADAS), and Autonomous Driving (AD) require multimodal datasets rich in quality and quantity to support the training of their sophisticated artificial intelligence (AI) algorithms. Perception, environment modeling, and planning algorithms in intelligent transportation solutions (such as those used in road infrastructure), AD vehicles, and ADAS systems require quality, representative, deep, high-definition, and up-to-date datasets of multiple modalities. The accuracy, effectiveness, and quality of decisions made by an AI algorithm are also dependent on the depth and breadth of the datasets used to train them.

One successful technique used to boost the accuracy and reliability of AI algorithms is to harvest datasets that represent failure events and then re-train the algorithms using the datasets. This is referred to as hard negative mining. Thus, the availability of datasets derived from failure events is also important in ensuring the robustness of AI algorithms.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

Figure 1:
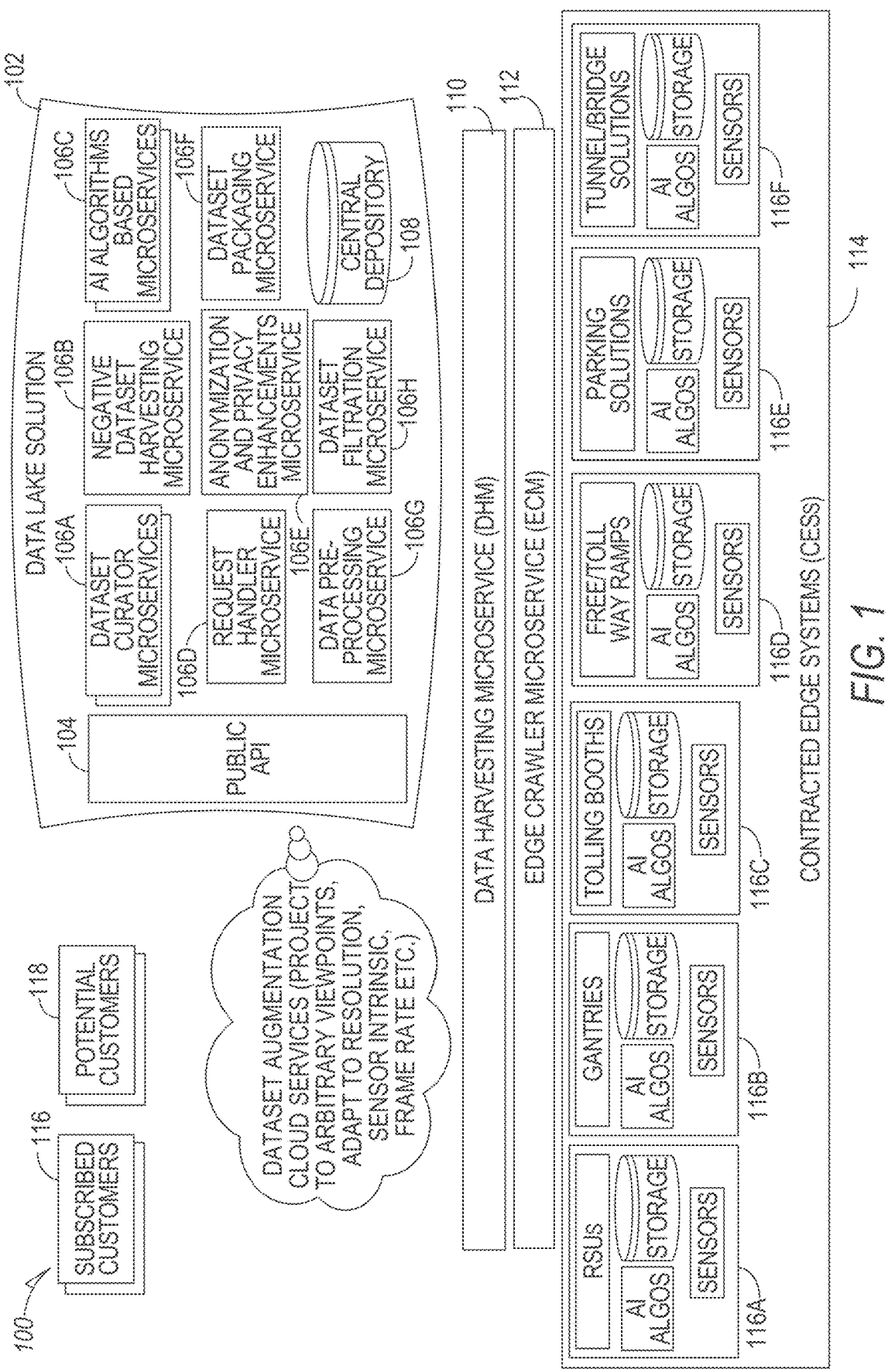
FIG. 1 is an overview diagram illustrating components of a multimodal data lake in at least some of the disclosed embodiments.

The disclosed embodiments recognize that it can be very challenging, expensive, and time-consuming for AI developers to each build a training dataset that is representative of a large variety of potential scenarios, conditions, and events, like those that occur under real-world traffic patterns or scenarios. Many existing datasets generally offer data representing a single modality (e.g., typically camera images and/or videos). Furthermore, when using existing light detection and ranging (LIDAR) and/or radio detection and ranging (RADAR) datasets, it is often difficult to identify corresponding camera projections, which can facilitate the training of sensor fusion algorithms.

Further adding to the complexity is the dynamic nature of real-world environments. A data set that adequately represents real-world scenarios ages relatively quickly and thus must be constantly updated. Thus, effective AI algorithms require training on datasets that have been recently updated to reflect the current environmental conditions under which they operate. Even small changes or trends in an environment, if not represented by a dataset, can result in significant degradations in the accuracy of AI algorithms. This degradation is unacceptable in mission-critical applications where human health or safety is at risk. AI vendors that rely on ad-hoc or manual collection of AI training data sets are unable to meet the demanding needs of AI applications. Moreover, many AI algorithms in the ADAS and AD space are trained using supervised learning techniques and thus require ground truth information for each dataset. This can be cost-prohibitive for many AI vendors to manually curate their datasets to provide this ground truth information.

Some vendors seek to augment their training data by collecting training data via their existing products. For example, these vendors equip their products with cameras or other sensors that continuously monitor their environment and opportunistically upload training data to a cloud-based training system. This approach also experiences several challenges. For example, the ability of a product to upload data will depend on the product's connectivity, and bandwidth to the cloud-based training system. Since many products are designed to minimize hardware cost, the product's ability to store large amounts of training data until appropriate connectivity and bandwidth are available for upload of the data can be limited. This limited storage can result in the product dropping or otherwise deleting sometimes large portions of collected training data due to an inability to upload the data before new data competing for the local storage space arrives.

Furthermore, in some product environments, there are privacy implications of uploading data captured by a product. Some customers may not provide permission to provide the data, thus limiting the training data to a non-random sample of customer environments. Furthermore, a developing legal environment adds risk to any AI training strategy that relies on collecting customer data for AI training. For example, some proposed legal framework forbid the uploading of customer data, even with the 'customer's permission.

To solve the technical problems associated with obtaining a robust training set for AI algorithms, the disclosed embodiments propose a technical solution that enables access to a transportation environment data lake by AI algorithm vendors, such as vehicle OEMs, vehicle OEM suppliers, dataset curators, research institutes, law enforcement agencies, insurance providers, fleet owners, mobility as a service providers, or utility companies. This transportation environment data lake can be used by these entities to improve the accuracy and robustness of their AI algorithms. Other entities might also have some need for data included in the proposed transportation environment data lake. For example, a vehicle owner (or a vehicle fleet owner) and/or their insurance carrier might subscribe to notifications of data relating to their vehicle or vehicle fleet. Thus, when a vehicle is involved in an accident, the vehicle owner, fleet owner, or insurance provider benefits via access to video footage of the accident. Fleet owners might use video data to enhance driver training. Law enforcement and/or an insurance carrier might use the available video data in legal proceedings. Additionally, some fleet owners find it advantageous to maintain a historical record of locations visited by their vehicles. Such a historical record is made possible via the capturing of vehicle data from roadside infrastructure solution sensors. As another example, a utility company could subscribe to the proposed transportation environment data lake service to receive a notification when an asset owned by the utility company (e.g. a streetlight or manhole cover) is involved in an accident or requires maintenance.

Some of the disclosed embodiments leverage existing road infrastructure solutions (such as roadside units, aka RSUs, gantries, parking solutions, and MECs). This road infrastructure is frequently equipped with multimodal sensors, compute platforms, connectivity solutions (e.g., including vehicle to everything (V2X)), local storage, and solution infrastructure. Road infrastructure is now increasingly being equipped with AI algorithms (e.g., perception, environment modeling, and planning algorithms), as well as sensors having modalities that overlap with sensor modalities used by AD and ADAS solutions. Generally, sensors deployed within infrastructure solutions have fewer constraints on power, size, cost, etc.; hence, they are powerful, high in resolution, and offer a relatively high quality of data. These sensors are also, in at least some cases, strategically placed so as to collect valuable sensor data. For example, the infrastructure solutions are, in some cases, placed on an elevated platform or in naturally elevated locations. Infrastructure positioned near traffic intersections or gantries, in some cases, have multiple sensors configured to provide seamless coverage of an area. Thus, by harvesting data from these infrastructure solutions, a holistic view of events can be provided for the training of AI algorithms.

Some road infrastructure also includes processing power sufficient to process sensor data and determine ground truth information. As discussed above, ground truth information is applied in supervised learning environments. Thus, some of the disclosed embodiments collect estimated ground truth information from stable storage within roadside infrastructure devices and make this information available for training AI algorithms. In some embodiments, a supervision entity is added to validate the estimated ground truth information based on other data sources (e.g., accident reports, traffic sensors) or human-provided information (e.g., received by a human road operator evaluating surveillance monitors) before it is provided for training AI algorithms. In some other embodiments, estimated ground truth information obtained from road infrastructure is conditionally tagged or labeled as ground truth information if a scene has been captured by multiple sensors from multiple perspectives, and independently generated metadata generated about the scene from the multiple sensors is in agreement on the ground truth estimates information.

Providers of these road infrastructure solutions are able to sign up as a contracted edge system (CES). As a registered CES, the providers render their sensor data, compute, storage and other service while also obtaining a share of revenue generated from the transportation environment data service 102. This solution allows the road infrastructure solution provider to retain their process independence, quality of service of original services, security and required level of process and data isolation. When a CES registers as a data provider, the disclosed embodiments receive details of the CES including a location of the CES, extrinsic/intrinsic information of each sensor supported by the CES, and system details of the CES. The CES also provides information that enables the environmental data lake to access data stored at each infrastructure solution supported by the CES. For example, in some embodiments, the CES provides special login credentials to the environmental data lake to enable agents of the environmental data lake (e.g. a data harvesting microservice (DHM) and/or an edge Crawler Microservice (ECM)/edge service), both of which are discussed further below, to login and access data to be collected. In some embodiments, the CES obtains a callback API from the environmental data lake that allows the CES to proactively push this data to the environmental data lake, thus reducing any risks imposed on the CES by participation as a data provider.

The disclosed ECM is able to harvest data, in at least some embodiments, from a variety of CES systems designed, implemented, or maintained by a diverse set of vendors. The disclosed embodiments contemplate interoperability with most, if not all, CES systems while imposing a minimum number of compatibility requirements on the CES system's architecture. To accomplish this interoperability, the ECM is designed to parse a variety of metadata formats produced by a variety of CES vendors. Additionally, different CES installations will include a variety of different sensors and sensor configurations. Additionally, different CES vendors or installations will integrate a variety of different AI algorithms, each of which may vary in its accuracy. that varies in their accuracy. ECM also needs to be mindful of facilitating DHM to harvest diverse sets of data to avoid biases in datasets, i.e., deprioritize overrepresented data and prioritize underrepresented data.

In some embodiments, when a CES registers with the disclosed transportation environment data service, the CES provides a file indicating a format of its metadata. The disclosed embodiments utilize this file as an aid to important data from the CES's metadata to the data lake and the transportation environment data service. In some embodiments, the CES also provides snapshot records, the snapshot records indicating weather conditions and a time at which the snapshot was taken. Each snapshot also includes sensor data and metadata indicating any analytic output of its AI algorithms based on the sensor data. Some of the disclosed embodiments use the snapshot records to generate an accuracy metric associated with each weather condition.

In some embodiments, the disclosed ECM imports data from an ECM, stored in a proprietary metadata format, and translates the data into a standard metadata format (e.g. metadata internal representation (IR)) before storing the data in the data lake for access by the transportation environment data service. The standard metadata format facilitates queries against the metadata regardless of the ECM from which the corresponding data was sourced.

When a request is received for a dataset or a criteria is defined for a self-curated dataset, the ECM represents a target query for the dataset in metadata IR (e.g, query for data representing at least five vehicles with a daytime rainy condition). When visiting CES ECM first translate that CES metadata stream to IR format by calling the metadata translation microservice. CES runs the target query IR against the translated metadata IR to if there's a match. For the matches found will be tagged accordingly for DHM's benefit.

While parsing the metadata, ECM refers to the corresponding (depending on the time/condition) originally calculated accuracy metric for that CES. If it is deemed to be low, the data will be flagged accordingly so in the dataset generation step those flags will trigger ground truth generation to replace what is found on the CES metadata.

The diversity of datasets will come from different aspects such as kinds of intersections (3-way, 4-way, etc.), number of lanes in the road, gradients of the road, weather conditions, time of the day, incidents recorded, density of objects, and sensor resolution. Already harvested data samples are projected to N-dimensional diversity space (using autoencoders) where each sample is a point. To ensure the diversity of the datasets, ECS will sample random frames from the potential segments of sensor data and project them to the diversity space. ECS will rate each frame in the representation index, where frames that fall very close together with existing data samples get a lower score and ones that fall far away get rated higher. When the DHM visits the CES, it will prioritize the segments with a higher representation index in harvesting.

Some CES nodes include weather sensors, which sense one or more weather conditions such as an amount of rain, a visibility, or a luminance level. When a CES node includes such information, some embodiments of the disclosed ECS harvest this data and integrate the data with other data from other sensors (such as one or more of an imaging sensor, LIDAR, or RADAR sensor).

A perception algorithm's accuracy typically degrades somewhat in certain weather conditions. Capturing weather information as described above can enhance models by by providing training inputs to a model indicating the weather conditions when training images were collected.

The ECM or edge service then tailors its analysis to augment any existing analysis provided by the CES, such that processing overhead is not duplicated. Once the data has been tagged, the DHM will periodically harvest data (including, for example, raw sensor data with sensor IDs, other sensor data such as V2X data, including vehicle sensor data transmitted via V2X, or V2X connectivity data, corresponding analytic results (e.g., for use in ground truth calculations), and other derived metadata) from the CES nodes. Other than the sensor data itself, the DHM will collect intermediate data inputs such as any environment models generated by the CES nodes. The environmental models are then uploaded to the environmental data lake, and later used to unit train/validation of planning algorithms.

In some cases, the disclosed embodiments populate the data lake based on explicit requests for data. For example, a consumer subscribes, in some embodiments, via a secure subscription API. The consumer needs, in some embodiments, to enhance the robustness of their AI object recognition algorithm under foggy weather conditions, and therefore requests datasets from an imaging sensor and LIDAR sensor of at least five hours of images/video with said foggy weather conditions. The consumer further specifies, in some embodiments, via the API, that at least ten other vehicles must be present in the image and LIDAR data, and at least five pedestrians should be present. The request further specifies that the imagery should be captured in suburban settings.

Based on the request, the disclosed embodiments of a transportation environment data service curate sensor data included in a repository to assemble a data set to satisfy the request. For example, available data is filtered to identify data captured during foggy conditions, with the required ten vehicles and five pedestrians being included. The data is curated until data meeting the length requirement (five hours) is assembled. A response to the request is then generated that provides the curated data.

Each dataset generation task processed by the disclosed embodiments includes a completion criterion. In some cases, the completion criterion is derived from an original request for the dataset. For example, a request for a dataset specifies, in some embodiments, a number of images or duration of any recorded stream of video, particular weather conditions, events, objects, geographies, and modalities that the dataset is to be derived from.

Self-curated datasets are periodically updated with harvested data, an update to an existing version of the curated data set is made based on the periodic update. In some embodiments, updates to curated datasets also have one or more completion criterion. Some embodiments provide for a publish/subscribe operating model, which allows interested entities to subscribe to updates of curated data sets. Once the periodic update of a curated data set is completed, notifications to any subscribers are made. The subscribers are then able to obtain the updated, curated data set at a time of their choosing.

Some embodiments provide raw environmental sensor data to requesting clients. As one example, sensors of an autonomous vehicle have a limited range, and it can be advantageous, at least in certain circumstances, for the autonomous vehicle to be able to extend its sensing range. This capability is provided, in at least some embodiments, in real-time, either via streaming live sensor data to the vehicle or by providing digitalized environment status updates (where objects in the environment is detected, identified and located by the system) as metadata. Such a capability provides, in various embodiments, an extension of sensor ranges and/or view point extension. For example in one example scenario, a vehicle A, is to make a decision as to whether to proceed at an intersection. The vehicle is positioned at a stop sign and from that position, is unable to sense, via its integrated sensors, other vehicles on the street so as to determine if it is safe to enter the intersection or not (e.g., this may be due to obstacles or a particular manner in which streets intersect, etc.) In this example scenario, vehicle A elects, in some embodiments, to obtain a live sensor feed from the environmental data lake. The environmental data lake is being provided with a sensor feed from a second vehicle within a proximity (e.g. near) the intersection. Alternatively, a service running off-board vehicle A determines whether it is safe for vehicle A to enter the intersection (e.g. based on viewpoints of one or more vehicles being provided to the data lake, and provides that decision to vehicle A.

Some embodiments provide an API that enables an autonomous vehicle to register for sensor data updates along a specified path. In some of these embodiments, the autonomous vehicle provides information to the environmental data lake indicates a route of travel and the current position of the autonomous vehicle. The autonomous vehicle also provides, in some embodiments, position updates to the environmental data lake as it proceeds along the route. In response to the position updates, some embodiments of the environmental data lake provide any most recent sensor information of a location stored by the environmental data lack at a predetermined time in advance of a projected arrival of the autonomous vehicle at the location.

If a particular OEM is subscribed to updates on negative data sets, they will receive updates as negative datasets are identified. The subscription can meet one or more specific criterion for the subscription, such as a criterion specifying particular vehicles or systems of interest to the OEM. Therefore, in this case, negative datasets not meeting the criterion specified for the subscription will, of course, not result in a notification to these subscribers.

Some embodiments include a dataset augmentation microservice (DAM). The DAM is configured to project a dataset to any point of view, to a given resolution, modality, frame rate, or per given sensor intrinsic properties. The projection of datasets can be particularly useful in training AD algorithms, which are frequently optimized to the point of view of the target vehicle. The DAM allows data collected from different points of view to be adapted to the target point of view, thus increasing the value of this data and also providing the target vehicle with a more varied and robust training data set.

Some embodiments include additional microservices to perform, for example, one or more of filtration, pre-processing, anonymization privacy enhancement or packaging. These microservices operate on the harvested data residing in the data lake to further refine datasets.

At any given time, multiple microservices may be operating in parallel on data included in the data lake, resulting in multiple different datasets being created in parallel. For example, some embodiments assign a first set of microservices to process data for a first data request and a second set of microservices to process data to satisfy a second request. In some embodiments, an orchestrator is implemented that manages and optimizes the parallelization of microservices. In some embodiments, the orchestrator runs inside the transportation environment data service and orchestrates the microservices to accomplish a task based on requests received by the transportation environment data service.

Typical CES will have an array of multimodal sensors (array of cameras, an array of LIDARs, and an array of RADARs) covering a given area. Some CES also collect data via V2X connectivity. In some embodiments, a packaging microservice synchronizes streams from these multimodal sensor arrays and packs them in a data structure with the sensors intrinsic and extrinsic in a way that is easy to recreate the wholistic scene, this data structure is called the wholistic sensor data structure (WSDS). In some embodiments, V2X data is also packed in the data structure.

The AI algorithms running on CES nodes will differ from one another, hence the quality of their results will also vary. Furthermore, any analytics run on data stored on CES nodes also varies, as do their respective results. The disclosed embodiments consume this disparate data and analytical results and generate consistent ground truth indications of consistent quality.

Therefore, first, the analytic results collected by CES 'node's metadata are parsed to ensure they could satisfy the ground truth requirement for the dataset being produced. Then the WSDS is used to re-create the wholistic scene and the CES 'node's analytic results are validated by running AI algorithms on the wholistic scene. In some embodiments, a plausibility check is also performed. The nodes analytic results are corrected when needed. Where CES analytic results 'doesn't fully cover the ground truths required for that dataset, missing ground truths are also generated. The calculated ground truths are appended to WSDS to provide the final data structure for the given dataset.

In some situations, the perception information from onboard sensors of the vehicles and high definition map may not agree. In such situations, the data lake could function as an attestation service. Another possibility is the confidence level of object detection from the onboard perception pipeline falls below a threshold. The AV obtains a sensor dataset from the data lake to help with the navigation.

In some cases, a temporary change is traffic routing may occur. For example, this can occur in the event of a traffic accident and/or construction. The disclosed embodiments include an API capable of capturing temporary changes in traffic routing. The API also provides for a location in which the ECM, discussed above, can capture appropriate data in the data lake. The DHM then collects information from the indicated location.

Some of the disclosed embodiments recognize that perception information derived from onboard sensors of vehicles does not agree with high-definition maps. As such, some of these embodiments provide a data attestation service. Furthermore, in some cases, a confidence level of an object detection operation performed by a vehicle's on-board perception pipeline is below a confidence threshold. Thus, some embodiments provide real-time sensor data from the data lake to the vehicle, which augments the vehicle's ability to perform object detection. In some embodiments, the vehicle queries the data lake to obtain a most recent set of sensor data at a specific location in which the low confidence object is located. The vehicle is then able to perform additional object detection based on data provided by the data lake in response to the query.

In other embodiments, an autonomous vehicle's sensor range is enhanced by obtaining sensor data from the data lake that is collected from locations outside the AV's sensor range. In some embodiments, the disclosed transportation environment data service streams sensor data (e.g. in real-time) to the vehicle. In some embodiments, the streamed sensor data is provided to the vehicle as metadata.

In still other embodiments, an AV's perception system is enhanced by obtaining sensor data from a direction or perspective that is not possible via on-board sensors (e.g an overhead view or elevated view). Thus, these embodiments contemplate an ability of the AV to request sensor data in accordance with the direction or perspective. In some embodiments, the transportation environment data service projects data it has available to the perspective requested by the AV, and then provides the projected data to the AV.

Other embodiments recognize that an AD application may have high confidence in results from an on-board perception system, but have low confidence regarding a resulting motion plan. As one example, the AD application needs to make a judgment, in an example scenario, as to whether a detected pedestrian will jay walk into an intersection. Some embodiments provide for the transportation environment data service to consult historical data on the intersection, or other intersections, to enhance a prediction of what action the pedestrian will take. Such a solution can increase confidence of the vehicle's motion plan, at least in some embodiments.

At least some of the above examples include minimum delay constraints. To facilitate the transportation environment data service is meeting those constraints, an interface between the vehicle and the transportation environment data service provides for the vehicle to indicate a query friendly and specific location for which data is requested (e.g. octree encoding in some embodiments). The octree encoding standard provides for encoding of objects of any size, and resolution, and provides for relatively fast query times.

FIG. 1 is an overview diagram illustrating components of a multimodal data lake 100 in at least some of the disclosed embodiments. FIG. 1 shows a transportation environment data service 102. The transportation environment data service 102 includes, in some embodiments, computing hardware components and/or software components necessary to perform one or more of the functions discussed below with respect to the transportation environment data service 102. The transportation environment data service 102 provides, in some embodiments, an API 104 that allows access to services provided by the transportation environment data service 102.

The transportation environment data service 102 also includes a plurality of microservices, including a dataset curator microservice 106A, a negative dataset harvesting microservice 106B, artificial intelligence-based Microservices 106C, a request handler microservice 106D, an anonymization and privacy enhancement microservice 106E, a dataset packaging microservice 106F, a data pre-processing microservice 106G, a dataset filtration microsoft 106H. Some embodiments also include a microservice orchestrator The transportation environment data service 102 also includes a data repository 108.

Also shown in FIG. 1 is a dataset harvesting microservice (DHM) 110 and an edge Crawler Microservice (ECM) 112 or edge service. FIG. 1 also shows that a plurality of contracted edge systems (CESs) 114 provides the infrastructure crawled by the DHM 110 and ECM 112. For example, FIG. 1 shows CESs 114 providing roadside units 116A, gantries 116B, tolling booths 116C, freeway or tollway ramps 116D, parking solutions 116E, and tunnel or bridge based solutions 116F.

FIG. 1 is an example of a transportation environment data service 102 that utilizes the DHM 110 and ECM 112 microservices to crawl infrastructure and other edge nodes (e.g. 116A-F) maintained by the CESs 114 to harvest data and copy the data to the data repository 108. From the data stored in the data repository 108, AI training datasets are created. In some cases, the training datasets are generated via one or more of the microservices 106A-H. In some cases, the training datasets include ground truth information. This information is made available to subscribed customers 118 and/or potential customers 118 via the API 104.

The DHM 110 and ECM 112 operate on each registered CES 114 within a MaaS geography. The microservices generally operate at a low priority within the CES 114 (e.g. within the infrastructure of each of the infrastructure solutions 16A-F) and thus do not disrupt the nominal operation of the CES.

In many cases, one or more of the infrastructure solutions 116A-F stores sensor data by default. Many infrastructure solutions 116A-F also store any output computed based on the stored sensor data and maintain this information for at least several days. This storage of sensor data and computed results allow the ECM 112 to crawl CES 114 data storage and tag the data (using AI algorithms) to indicate, for example, specific weather conditions (light condition, rain, snow, temperature, etc.) or other particular environmental conditions. To tag the data, the ECM 112 will parse any metadata generated by the CES infrastructure solutions 116A-F, thus leveraging data analysis performed by the CES infrastructure solutions 116A-F. Some CES metadata identifies events, such as collisions, near-miss collisions, anomalies, V2X notifications, of counts of vehicles and pedestrians.

Harvesting of data from CES infrastructure solutions 116A-F by the DHM 110 and ECM 112 is configured to run at a frequency such that the data is obtained before the CES infrastructure solutions 116A-F delete any accumulated data as part of their normal data maintenance process. After harvesting, the data is stored at the data repository 108, and, in some embodiments, an indication of its source CES infrastructure solution (e.g., any one of 116A-F) is maintained.

Some of the disclosed embodiments also identify and harvest negative datasets based on these events being flagged by processing within a CES. DHM will harvest these negative datasets and store them in the data repository 108. Some embodiments run additional processing algorithms on these negative datasets to identify, for example, manufacturers and/or vehicle models, owners (e.g., for vehicle fleet owners), or service providers (e.g., utility service providers for manholes, etc.) involved in those events.

The API 104 includes, in some embodiments, one or more of a registration API, a subscriber API, or a notification API. The registration API allows an edge system, such as one of the CES 114, discussed further below, to register as a data provider to the transportation environment data service 102. The edge system provides, via the registration API, authentication or access credentials that provide access to resources of the edge system. For example, the authentication or access credentials enable, in some embodiments, a microservice or other agent of the transportation environment data service 102 to obtain access to data stored by an infrastructure solution, as discussed below. A subscriber API enables customers 116 to subscribe to data updates from the transportation environment data service 102. The notification API allows customers to receive notifications of updated data from the transportation environment data service 102. For example, in some embodiments, the notification API allows a vehicle to register a planned route with the transportation environment data service 102. The transportation environment data service 102 then provides updated sensor data along the planned route in connection with the 'vehicle's progress along the route. For example, the vehicle provides updates on its current position, in at least some embodiments, to the transportation environment data service, and the transportation environment data service 102 provides updated sensor data proximate to the current position, at least in some embodiments.

Figure 2:
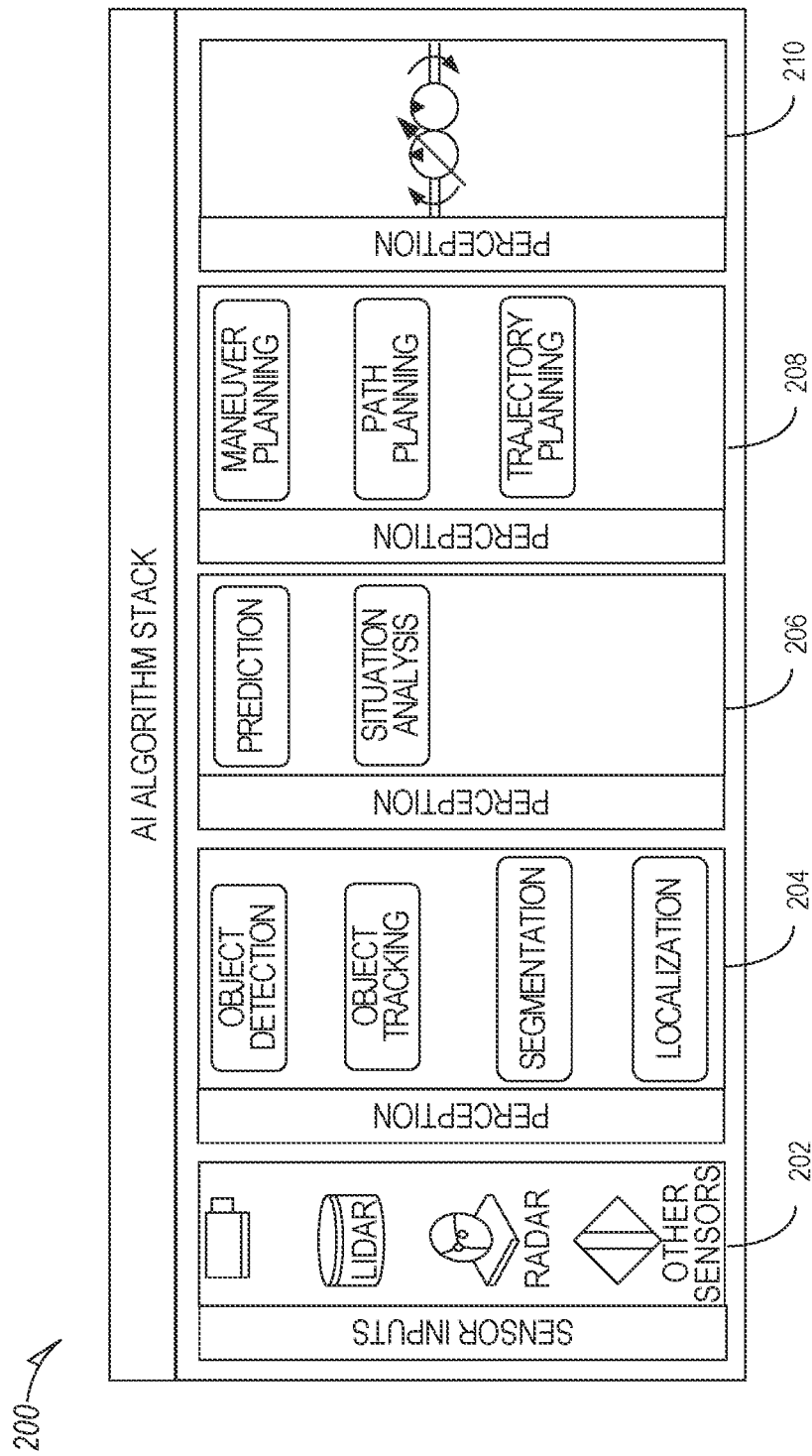
FIG. 2 is an overview diagram of an artificial intelligence algorithm stack 200.

FIG. 2 is an overview diagram of an artificial intelligence algorithm stack 200. The AI algorithm stack includes several layers, including a sensor input layer 202, perception layer 204, environment modeling layer 206, planning layer 208, and a decision/action layer 210. As discussed above, some of the disclosed embodiments harvest one or more infrastructure solutions (e.g., 116A-F) to obtain data collected by those solutions. The data collected from the infrastructure solutions include, in some embodiments, sensor data, such as imaging sensor data, LIDAR data, RADAR data, other data from other sensors (wind, rain, precipitation, etc.), and data from V2X connectivity. Some infrastructure solutions include at least a portion of an AI stack and perform some level of processing within the infrastructure solution itself. Therefore, in some embodiments, the mining microservices provided by the disclosed embodiments (e.g., the DHM 110 and/or the ECM 112) collect or harvest data provided by, for example, the perception layer 204. For example, the DHM 110 and/or the ECM 112 collect, in various embodiments, information on objects detected by the infrastructure solution, object tracking information, segmentation information, or location information from the perception layer 204. In some embodiments, an infrastructure solution also implements an environment modeling layer 206. Thus, in some of these embodiments, the DHM 110 and/or the ECM 112 collect prediction data and/or situation analysis information from the infrastructure solution. In some embodiments, an infrastructure solution includes planning algorithms that generate maneuver planning data, path planning data, or trajectory planning information. Thus, the disclosed embodiments of the DHM 110 and/or the ECM 112 are configured to detect the presence of such information and move it to the data repository 108.

Figure 3A:
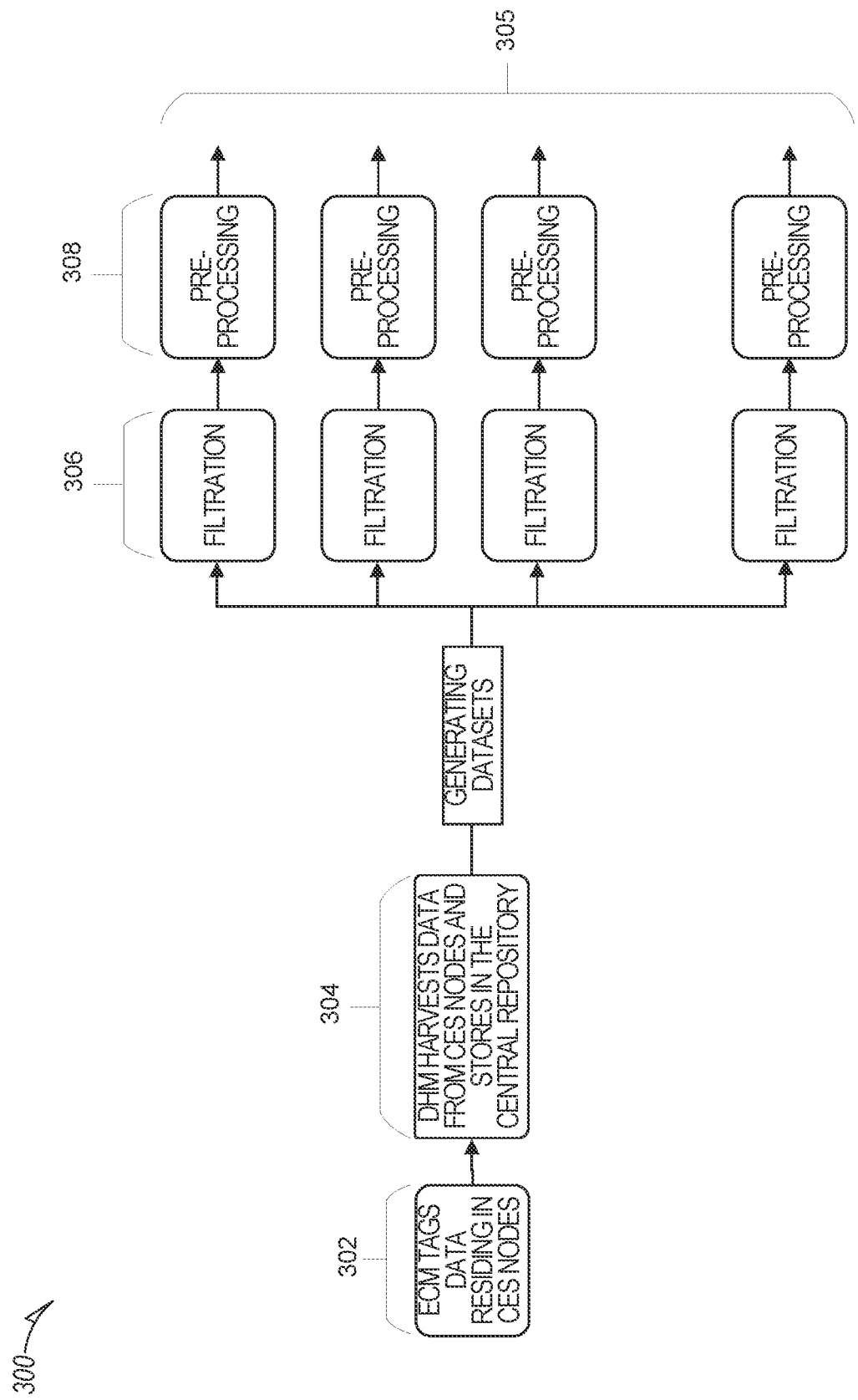
FIGS. 3A-B are an overview diagram showing parallel processing pipelines within one or more of the disclosed embodiments.
Figure 3B:
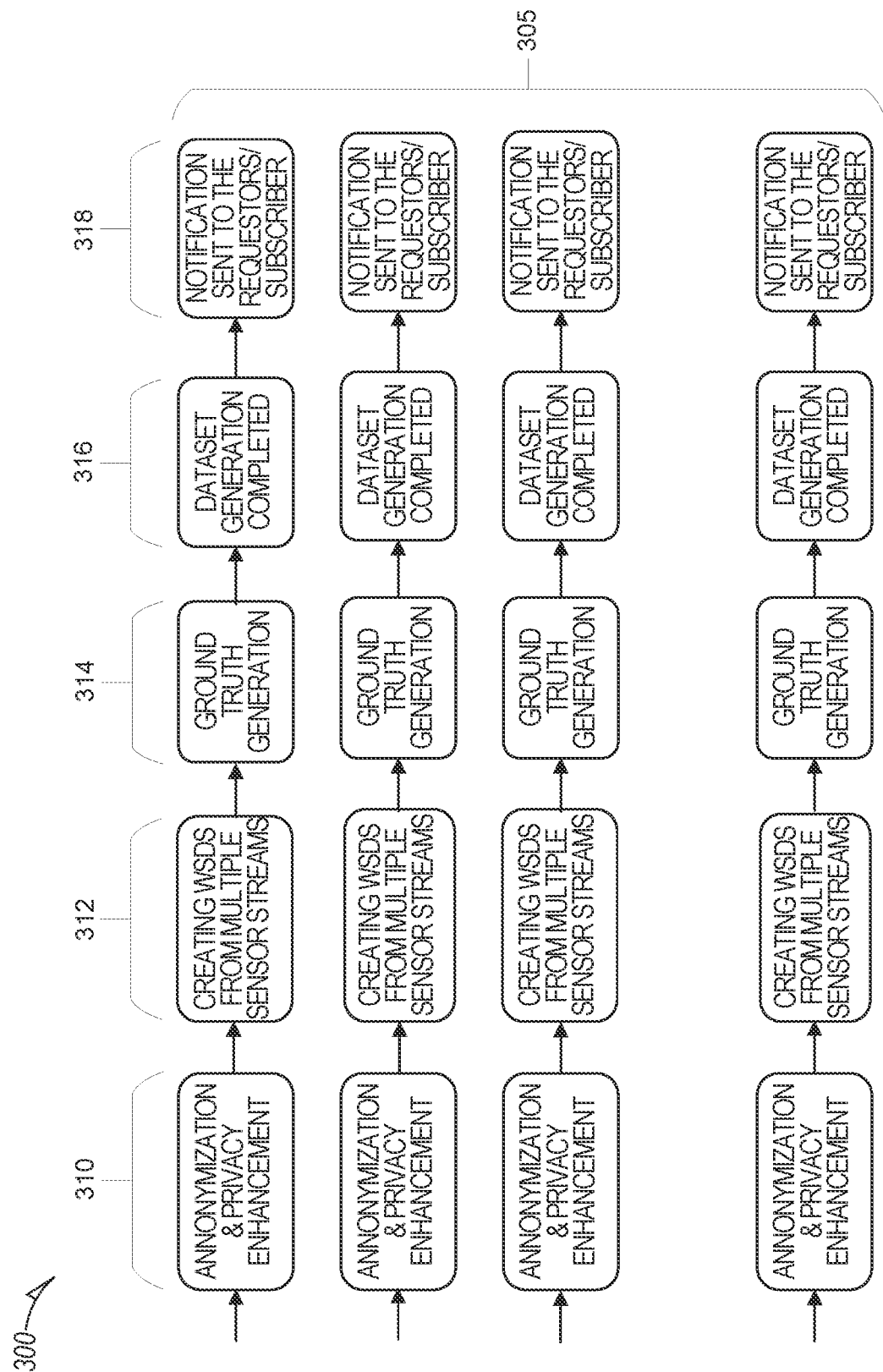

FIGS. 3A-B are an overview diagram showing parallel processing pipelines within one or more of the disclosed embodiments. FIG. 3A shows that at a first stage 302 of the pipeline 300, an ECM 112 tags data residing within one of the infrastructure solutions 116A-F provided by a CES 114. After the data is collected, during a second stage 304 of the pipeline 300, the DHM 110 sends the collected data to the data repository 108. Some of the disclosed embodiments then implement a plurality of processing pipelines 305 to process the collected data. Each of the plurality of processing pipelines includes a filtration stage 306, and a pre-processing stage 308. FIG. 3B continues the pipelines and shows an anonymization and privacy enhancement stage 310, a creation of a WSDS from multiple sensor streams that are included in the collected data stage 312, a generation of ground truth stage 314, after which generation of data is complete in a completion stage 316. Any notifications to subscribers resulting from the completion of the individual pipeline of the plurality of processing pipelines 305 is then provided in a notification stage 318.

Figure 4:
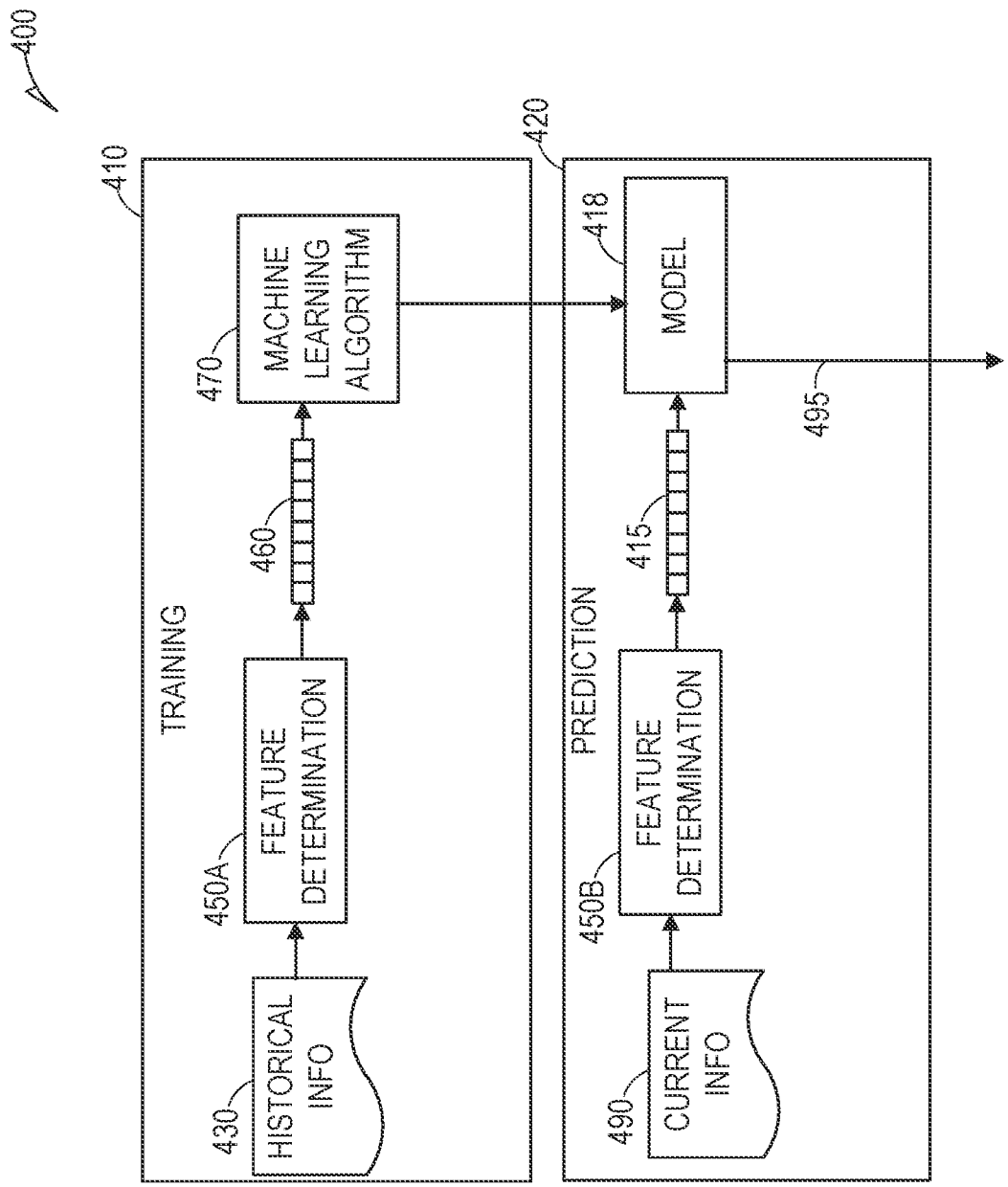
FIG. 4 shows an example of a machine learning module 400 according to some examples of the present disclosure.

FIG. 4 shows an example machine learning module 400 according to some examples of the present disclosure. Machine learning module 400 utilizes a training module 410 and a prediction module 420. Training module 410 inputs historical information 430 into feature determination module 450A. The historical information 430 may be labeled. Example historical information may include sensor data from one or more roadside infrastructure solutions, as discussed above. For example, one or more of weather data, traffic data, or accident incident data is provided in some embodiments. This historical information is stored in a training library in some embodiments. Labels included in the training library indicate future sensor data likely to be experienced in view of the historical sensor data provided as historical information 430.

Feature determination module 450A determines one or more features 460 from this historical information 430. Stated generally, features 460 are a set of the information input and are determined to be predictive of a particular outcome. In some examples, the features 460 may be all the historical information 430, but in other examples, the features 460 are a subset of the historical information 430. The machine learning algorithm 470 produces a model 418 based upon the features 460 and the labels.

In the prediction module 420, current information 490 may be input to the feature determination module 450B. The current information 490 in the disclosed embodiments include similar indications of that described above with respect to the historical information 430. However, the current information 490 provides these indications for relatively recently observed sensor data (e.g. within a previous one, two, five, ten, thirty, or sixty minutes time period).

Feature determination module 450B determines, in some embodiments, an equivalent set of features or a different set of features from the current information 490 as feature determination module 450A determined from historical information 430. In some examples, feature determination module 450A and 450B are the same module. Feature determination module 450B produces features 415, which is input into the model 418 to generate a one or more predictions of sensor data during a prospective time period. The training module 410 may operate in an offline manner to train the model 418. The prediction module 420, however, may be designed to operate in an online manner. It should be noted that the model 418 may be periodically updated via additional training and/or user feedback.

The prediction module 420 generates one or more outputs 495. The outputs include, in some embodiments, one or more predictions as to sensor data or object detection or object recognition data for the prospective time period The machine learning algorithm 470 may be selected from among many different potential supervised or unsupervised machine learning algorithms. Examples of supervised learning algorithms include artificial neural networks, Bayesian networks, reinforcement learning networks, federated learning networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, hidden Markov models, models based on artificial life, simulated annealing, and/or virology. Examples of unsupervised learning algorithms include expectation-maximization algorithms, vector quantization, and information bottleneck method. Unsupervised models may not have a training module 410. In an example embodiment, a regression model is used, and the model 418 is a vector of coefficients corresponding to a learned importance for each of the features in the vector of features 460, 415. In some embodiments, to calculate a score, a dot product of the features 415 and the vector of coefficients of the model 418 is taken.

Figure 5:
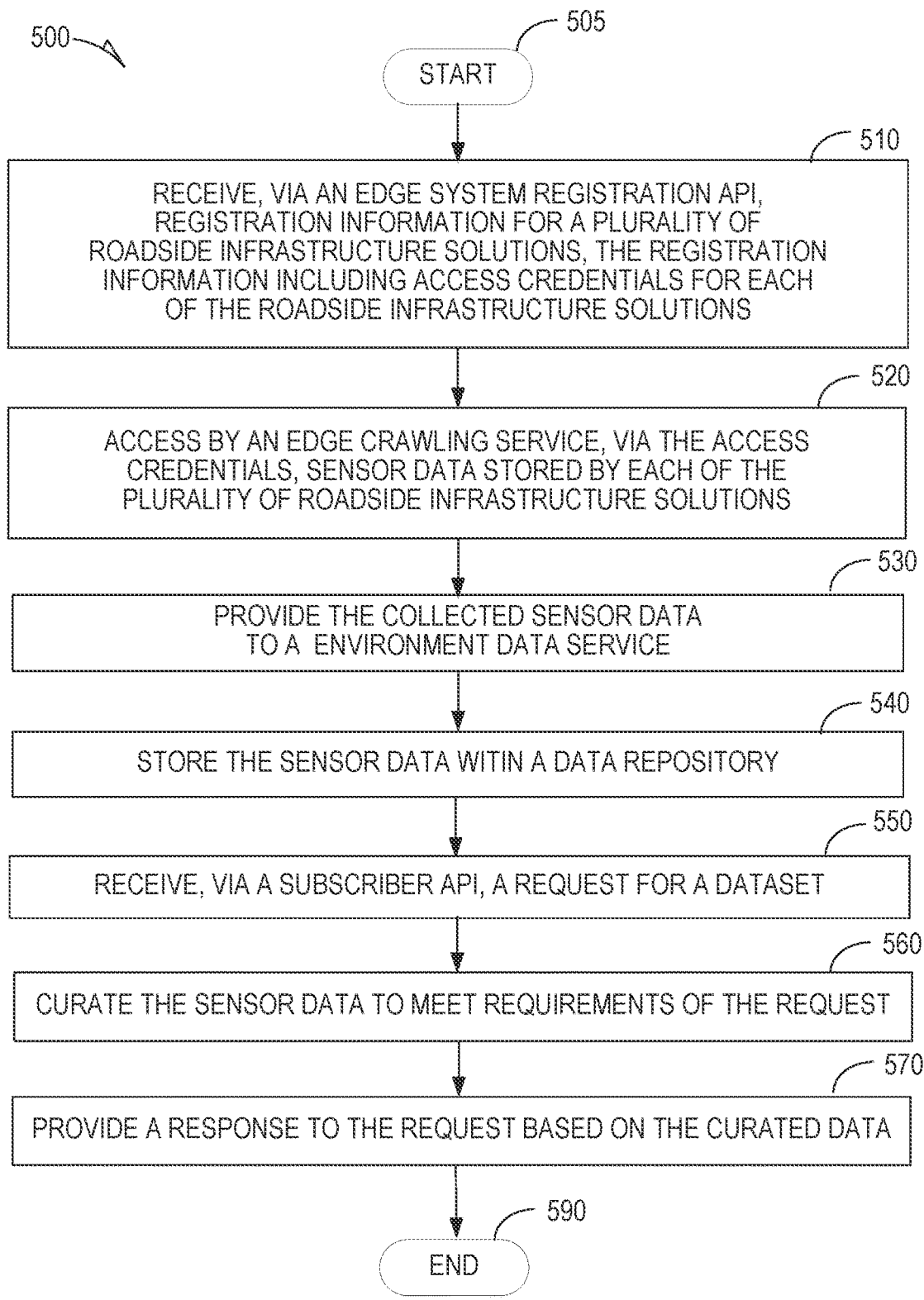
FIG. 5 is a flowchart of an example method of providing transportation environment data.

FIG. 5 is a flowchart of an example method of providing transportation environment data. In some embodiments, one or more of the functions discussed below with respect to FIG. 5 and method 500 are performed by hardware processing circuitry. For example, in some embodiments, instructions (e.g., 624 discussed below) stored in one or more electronic memories (e.g., 602 and/or 604 discussed below) configure hardware processing circuitry (e.g., hardware processor 602 discussed below) to perform one or more of the functions discussed below with respect to FIG. 5 and method 500. In some embodiments, method 500 is performed by a computing apparatus and/or a computing system included in the transportation environment data service 102, discussed above with respect to FIG. 1. For example, in some embodiments, a computing apparatus and/or computing system included in the transportation environment data service 102 implements one or more instances of the machine 600, discussed below with respect to FIG. 6, upon which one or more of the functions of method 500 are performed.

After start operation 505, method 500 moves to operation 510.

In operation 510, registration information is received, via an edge system registration API, for a plurality of roadside infrastructure solutions. The registration information includes access credentials for each of the roadside infrastructure solutions.

In operation 520, an edge service accesses, via the access credentials, sensor data stored by each of the registered infrastructure solutions. The roadside infrastructure solutions include one or more of a roadside unit, a gantry, a toll booth, a freeway or tollway ramp, a parking structure, a tunnel, or a bridge. Each of the plurality of roadside infrastructure solutions includes at least one environmental sensor and a stable storage device storing a history of data collected from the environmental sensor. The edge service accesses the stable storage device to obtain the sensor data.

As discussed above, one or more of the DHM 110 and/or the ECM 112 (e.g. a edge service) obtain access to local storage at one or more infrastructure solutions (e.g., 116A-F) in order to harvest sensor data, or other data, from the one or more infrastructure solutions. As discussed above, some infrastructure solutions process sensor data to generate intermediate results. These intermediate results include, in some embodiments, object detection information, object recognition information (e.g., distinguishing a detected object as a particular type of object) (e.g., recognizing a vehicle, bicycle, pedestrian, traffic light, or other object encountered within a transportation environment).

In operation 530, the harvested or collected sensor data is provided to the transportation environment data service. For example, as discussed above, in some embodiments, one or more of the DHM and/or ECM 112 provide data to the transportation environment data service 102.

In operation 540, the harvested data is stored in a data repository (e.g. data repository 108) of the transportation environment data service 102.

In operation 550, a request is received for a dataset from a subscriber API. As discussed above, a request for data, in some embodiments, specifies one or more requirements for the data being requested. For example, the request specifies, in various embodiments, one or more of a type of sensor that collected the transportation dataset (e.g. LIDAR, imaging sensor, infrared sensor RADAR sensor, ultrasonic sensor, ambient light sensor, V2X data), a weather condition represented by the transportation dataset, an ambient light level represented by the transportation dataset, a lower limit on a number of vehicles represented by the transportation dataset, or a time range represented by the transportation data set. The time range specified in some embodiments, a date and/or time range. In some embodiments, the time range specifies a recurring time range, such as between 8 AM and 10 AM weekday mornings, or similar recurring time period or range.

In some embodiments, the request defines object type criterion. The object type criterion specifies one or more object types that satisfy the request. For example, in some embodiments, the request specifies a request for video data of traffic lights meeting certain criterion (e.g., red traffic lights or partially obscured traffic lights).

In some embodiments, the request indicate a request for ground truth information.

In operation 560, the sensor data collected from the infrastructure solutions is curated so as to meet the requirements of the request. In some embodiments, curating the data includes one or more of filtering the data, pre-processing the data, anonymizing the data, enhancing privacy of the data, generating an environmental model from the data, determining ground truth information, and comparing the curated data for compliance with requirements of the request.

In some embodiments, curating the collected data includes analyzing metadata associated with the data to determine or confirm whether the data meets ground truth requirements. These requirements can include, for example, in some embodiments, one or ore quality criterion of sensor data, one or more criterion with respect to weather conditions under which the data was collected, results of a plausibility check, data crossing requirements, human intervention requirements, and/or redundancy requirements.

Depending on the dataset and requirements of a dataset being generated, there is, in some cases, minimum requirements for ground truth information. For example if a dataset is required to include images of traffic signs, some images included in the data lake will include traffic signs, but lack any secondary analytic information indicating detection of those traffic signs by an AI algorithm local to the roadside infrastructure from which the image was collected. In this case, metadata associated with the images will not satisfy the ground truth requirement. Some of the disclosed embodiments augment the images to derive ground truth information by running an AI algorithm on the data/images and then update the metadata with results derived from the AI algorithm.

To ensure the data meets ground truth requirements, in some embodiments, meta data of collected analytic results is parsed or decoded to ensure the data meets a ground truth requirement for the dataset being produced.

As discussed above, a WSDS is used to re-create a wholistic scene and the analytic results are further validated by running AI algorithms on the wholistic scene, and corrected when needed. If the analytic results do not adequately cover the ground truths required for a dataset, missing ground truths are also generated in some embodiments. The generated ground truths are appended, in some embodiments, to the WSDS to provide the final data structure for the given dataset.

If the data does meet the ground truth requirements, then method 500 generates ground truth information based on the data. In some cases, the metadata indicates the sensor data does not meet ground truth requirements. When this condition is identified, some embodiments of method 500 generate the ground truth information using other information. In some embodiments, the data is labeled with the ground truth information. For example, in some embodiments, metadata associated with the data is augmented to indicate the generated ground truth information.

In some embodiments, curating the collected data includes invoking one or more AI algorithms on the data to detect one or more events indicated by the collected data. For example, some embodiments invoke a machine learning model that is trained to detect traffic incidents, such as car accidents, violations of traffic rules (running a red light, failing to signal a lane change or turn), vehicle conditions that are unsafe (e.g., missing or inoperative lights, overloaded pick-up trucks. Subscribers then request notification of these detected incidents. The response generated by operation 560, discussed below, then provides information to the requesting subscriber about the nature of the incident. For example, a type of incident, a location of the incident, an identification or description of vehicles involved in the incident are provided, in various aspects, to a requesting subscriber.

Some embodiments provide sensor data to a machine learning model, and obtain predictions on sensor data values for a prospective time period. For example, in some embodiment, as discussed above with respect to the model 418, historical sensor information (e.g., 430) is used to train a machine learning algorithm (e.g., 470), which is then able to provide predictions (e.g., 495). This predicted sensor data is then provided to a requesting customer in operation 560, discussed below.

In operation 560, a response to the request is generated based on the curated data. For example, some embodiments of operation 560 include generating a network message including the curated data and transmitting the message to a requesting computer address specified in the request.

Some embodiments of method 500 include receiving, via a notification API, a request to receive sensor data updates. The request also specifies a route of a vehicle. Also, with the request, notifications are received indicating updates to the vehicles position as it moves along the route. In some embodiments, the notifications are periodic, but may arrive at any time. These notifications keep the transportation environment data service up to date on the 'vehicle's location along the route. The transportation environment data service also monitors sensor data along the route (e.g., within a predefined distance of the route and the 'vehicle's location). If new data is available, the transportation environment data service searches the data repository to determine if any of the new data meets criterion that make it relevant to the 'vehicle's route and the 'vehicle's current position. For example, the criterion specifies in some embodiments, a distance from the route and a distance ahead of the 'vehicle's current position (e.g., within 20 meters of the planned vehicle route and within one mile or kilometer from the 'vehicle's most recent position. If the criterion is met, a notification is sent to the vehicle indicating the new sensor data. With this service, a vehicle can be notified of any new information along its route by the transportation environment data service. The information is harvested, as discussed above, from a plurality of infrastructure solutions that are not readily accessible to the vehicle, but via the use of the transportation environment data service, visibility of the vehicle to current environmental conditions is greatly enhanced.

After operation 570 completes, method 500 moves to end operation 590.

Figure 6:
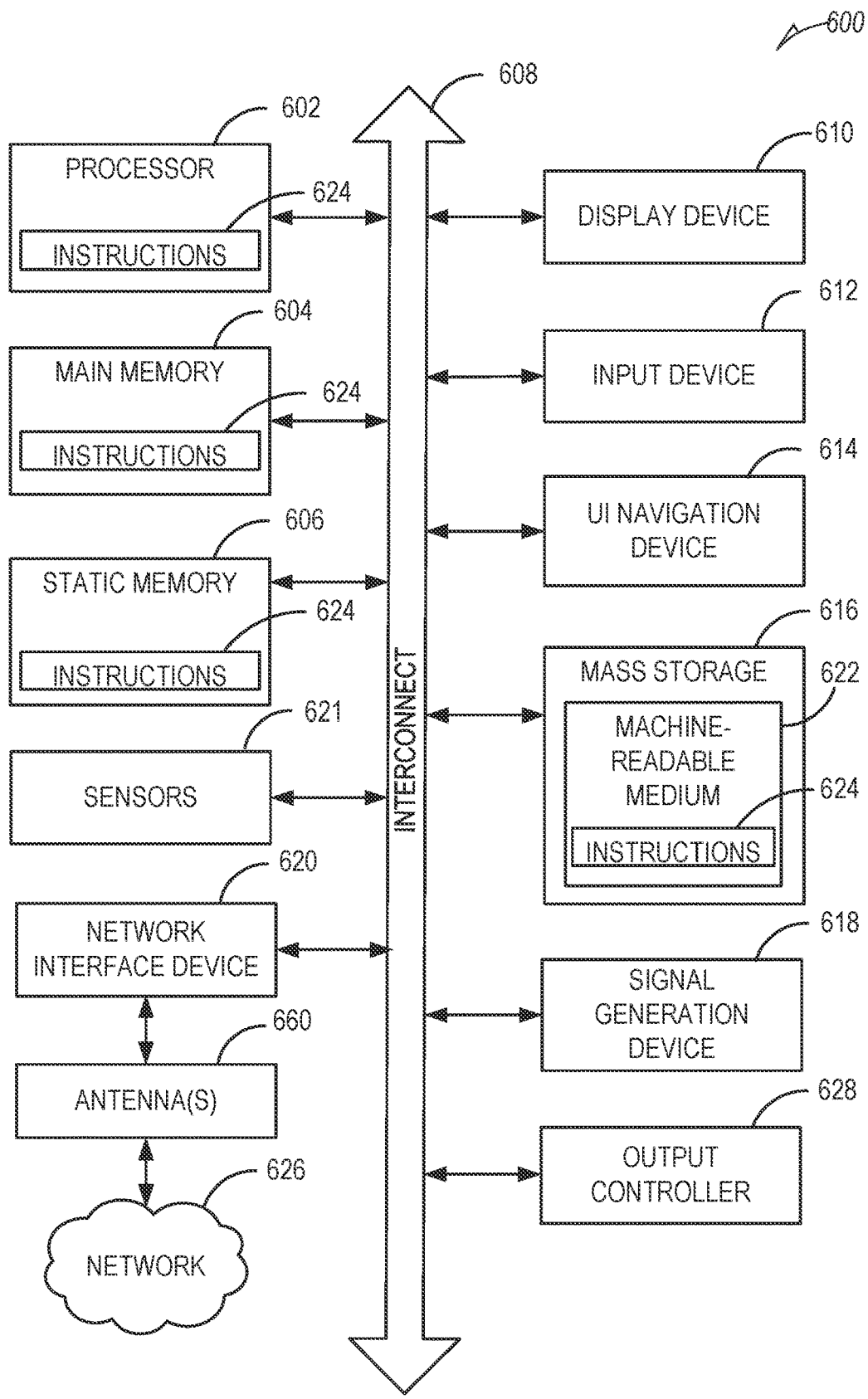
FIG. 6 illustrates a block diagram of an example machine 600 upon which any one or more of the techniques (e.g., methodologies) discussed herein may perform.

FIG. 6 illustrates a block diagram of an example machine 600 upon which any one or more of the techniques (e.g., methodologies) discussed herein may perform. Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink 608 (e.g., bus). In some embodiments, the example machine 600 is implemented by the transportation environment data service 102.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage device 616 (e.g., drive unit), a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the hardware processor 602 and/or instructions 624 may comprise processing circuitry and/or transceiver circuitry.

The mass storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the mass storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage device 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Example 1 is a system, comprising: a transportation environment data service configured to: receive, from an edge service, sensor data of a plurality of roadside infrastructure solutions; store the received sensor data within a data repository; receive, via a subscriber API, a request for a transportation dataset; the request specifying requirements for the transportation dataset; curate the sensor data to meet the requirements; and provide, in response to the request, the curated sensor data meeting the requirements.

In Example 2, the subject matter of Example 1 optionally includes wherein the curating of the sensor data includes anonymizing the sensor data.

In Example 3, the subject matter of any one or more of Examples 1-2 optionally include wherein the sensor data includes vehicle to everything (V2X) data.

In Example 4, the subject matter of any one or more of Examples 1-3 optionally include wherein the transportation environment data service is further configured to: receive, via a notification API, a request to receive sensor data updates, the request specifying a route of a vehicle; receive, via the notification API, periodic updates indicating a location of the vehicle along the route; in response to a periodic update, search the data repository for updated sensor data within a predefined distance of the location of the vehicle; identify, based on the searching, updated sensor data; and provide the updated sensor data to the vehicle.

In Example 5, the subject matter of Example 4 optionally includes wherein the transportation environment data service is further configured to: provide the updated sensor data from the data repository to a machine learning model; obtain predictions of sensor data during a prospective time period from the machine learning model; and provide the predictions of sensor data to the vehicle.

In Example 6, the subject matter of any one or more of Examples 1-5 optionally include wherein the plurality of roadside infrastructure solutions include one or more of a roadside unit, a gantry, a toll booth, a freeway or tollway ramp, a parking structure, a tunnel, or a bridge.

In Example 7, the subject matter of Example 6 optionally includes wherein each of the plurality of roadside infrastructure solutions includes at least one environmental sensor and a stable storage device storing a history of data collected from the environmental sensor, and wherein the edge service accesses the stable storage device to obtain the sensor data.

In Example 8, the subject matter of any one or more of Examples 1-7 optionally include wherein the sensor data includes metadata, wherein the transportation environment data service is further configured to analyze the metadata to confirm the sensor data meets ground truth requirements, generate ground truth information based on the sensor data, receive a request, via the subscriber API, for the ground truth information, and provide the ground truth information in response to the request.

In Example 9, the subject matter of Example 8 optionally includes wherein the transportation environment data service is further configured to determine that at least some of sensor data metadata does not meet ground truth requirements, and generate ground truth information in response to the determination.

In Example 10, the subject matter of any one or more of Examples 1-9 optionally include wherein the transportation environment data service is further configured to detect a traffic incident and a type of the traffic incident based on the sensor data; receive, from the subscriber API, a request for data indicating incidents of the detected type, and generate a response to the request indicating the detected traffic incident.

In Example 11, the subject matter of any one or more of Examples 1-10 optionally include wherein the requirements indicate one or more of a type of sensor that collected the transportation dataset, a weather condition represented by the transportation dataset, a number of vehicles represented by the transportation dataset, a time range represented by the transportation dataset.

In Example 12, the subject matter of any one or more of Examples 1-11 optionally include wherein the transportation environment data service is further configured to receive, via an edge system registration application programming interface (API), registration information for the plurality of roadside infrastructure solutions, the registration information including access credentials for each of the roadside infrastructure solutions, wherein the edge service accesses the sensor data via the access credentials.

In Example 13, the subject matter of Example 12 optionally includes wherein the transportation environment data service is further configured to access, via the access credentials, object detection data stored by at least one of the plurality of roadside infrastructure solutions, wherein the request further defines object type criterion of the transportation dataset, and the curating includes curating the object detection data to meet the defined object type criterion.

Example 14 is at least one non-transitory computer readable storage medium comprising instructions that when executed configure hardware processing circuitry to perform operations comprising: receiving, from an edge service, by a transportation environment data service, sensor data of a plurality of roadside infrastructure solutions; storing, by the transportation environment data service, the sensor data within a data repository; receiving, via a subscriber API, by the transportation environment data service, a request for a transportation dataset, the request specifying requirements for the transportation dataset; curating, by the transportation environment data service, the sensor data to meet the requirements; and providing, by the transportation environment data service, in response to the request, the curated sensor data meeting the requirements.

In Example 15, the subject matter of Example 14 optionally includes wherein the curating of the sensor data includes anonymizing the sensor data.

In Example 16, the subject matter of any one or more of Examples 14-15 optionally include wherein the sensor data includes vehicle to everything (V2X) data.

In Example 17, the subject matter of any one or more of Examples 14-16 optionally include the operations further comprising: receiving, via a notification API, a request to receive sensor data updates, the request specifying a route of a vehicle; receiving, via the notification API, periodic updates indicating a location of the vehicle along the route; in response to a periodic update, searching the data repository for updated sensor data within a predefined distance of the location of the vehicle; identifying, based on the searching, updated sensor data; and providing the updated sensor data to the vehicle.

In Example 18, the subject matter of Example 17 optionally includes the operations further comprising: providing the updated sensor data from the data repository to a machine learning model; obtaining predictions of sensor data during a prospective time period from the machine learning model; and providing the predictions of sensor data to the vehicle.

In Example 19, the subject matter of any one or more of Examples 14-18 optionally include wherein the plurality of roadside infrastructure solutions include one or more of a roadside unit, a gantry, a toll booth, a freeway or tollway ramp, a parking structure, a tunnel, or a bridge.

In Example 20, the subject matter of Example 19 optionally includes wherein each of the plurality of roadside infrastructure solutions includes at least one environmental sensor and a stable storage device storing a history of data collected from the environmental sensor, and wherein the edge service accesses the stable storage device to obtain the sensor data.

In Example 21, the subject matter of any one or more of Examples 14-20 optionally include wherein the sensor data includes metadata, the operations further comprising: analyzing the metadata to confirm the sensor data meets ground truth requirements, generating, by the transportation environment data service, ground truth information based on the sensor data; receiving a request, via the subscriber API, for the ground truth information; and providing the ground truth information in response to the request.

In Example 22, the subject matter of Example 21 optionally includes the operations further comprising determining that at least some of sensor data metadata does not meet ground truth requirements, and generating, by the transportation environment data service, ground truth information in response to the determining.

In Example 23, the subject matter of any one or more of Examples 14-22 optionally include the operations further comprising detecting a traffic incident and a type of the traffic incident based on the sensor data; receiving, from the subscriber API, a request for data indicating incidents of the detected type, and generating a response to the request indicating the detected traffic incident.

In Example 24, the subject matter of any one or more of Examples 14-23 optionally include wherein the requirements indicate one or more of a type of sensor that collected the transportation dataset, a weather condition represented by the transportation dataset, a number of vehicles represented by the transportation dataset, a time range represented by the transportation dataset.

In Example 25, the subject matter of any one or more of Examples 14-24 optionally include the operations further comprising receiving via an edge system registration application programming interface (API), registration information for the plurality of roadside infrastructure solutions, the registration information including access credentials for each of the roadside infrastructure solutions, wherein the edge service accesses the sensor data via the access credentials.

In Example 26, the subject matter of Example 25 optionally includes the operations further comprising accessing, via the access credentials, object detection data stored by at least one of the plurality of roadside infrastructure solutions, wherein the request further defines object type criterion of the transportation dataset, and the curating includes curating the object detection data to meet the defined object type criterion.

Example 27 is a method performed by hardware processing circuitry of a transportation environment data service, comprising: receiving, from an edge service, sensor data of a plurality of roadside infrastructure solutions; storing the received sensor data within a data repository; receiving, via a subscriber API, a request for a transportation dataset, the request specifying requirements for the transportation dataset; curating the sensor data to meet the requirements; and providing in response to the request, the curated sensor data meeting the requirements.

In Example 28, the subject matter of Example 27 optionally includes wherein the curating of the sensor data includes anonymizing the sensor data.

In Example 29, the subject matter of any one or more of Examples 27-28 optionally include wherein the sensor data includes vehicle to everything (V2X) data.

In Example 30, the subject matter of any one or more of Examples 27-29 optionally include receiving, via a notification API, a request to receive sensor data updates, the request specifying a route of a vehicle; receiving, via the notification API, periodic updates indicating a location of the vehicle along the route; in response to a periodic update, searching the data repository for updated sensor data within a predefined distance of the location of the vehicle; identifying, based on the searching, updated sensor data; and providing the updated sensor data to the vehicle.

In Example 31, the subject matter of Example 30 optionally includes providing the updated sensor data from the data repository to a machine learning model; obtaining predictions of sensor data during a prospective time period from the machine learning model; and providing the predictions of sensor data to the vehicle.

In Example 32, the subject matter of any one or more of Examples 27-31 optionally include wherein the plurality of roadside infrastructure solutions include one or more of a roadside unit, a gantry, a toll booth, a freeway or tollway ramp, a parking structure, a tunnel, or a bridge.

In Example 33, the subject matter of any one or more of Examples 27-32 optionally include wherein each of the plurality of roadside infrastructure solutions includes at least one environmental sensor and a stable storage device storing a history of data collected from the environmental sensor, and wherein the edge service accesses the stable storage device to obtain the sensor data.

In Example 34, the subject matter of any one or more of Examples 27-33 optionally include wherein the sensor data includes metadata, the method further comprising analyzing the metadata to confirm the sensor data meets ground truth requirements, generating ground truth information based on the sensor data, receiving a request, via the subscriber API, for the ground truth information, and providing the ground truth information in response to the request.

In Example 35, the subject matter of Example 34 optionally includes determining that at least some of sensor data metadata does not meet ground truth requirements, and generating ground truth information in response to the determining.

In Example 36, the subject matter of any one or more of Examples 27-35 optionally include detecting a traffic incident and a type of the traffic incident based on the sensor data; receiving, from the subscriber API, a request for data indicating incidents of the detected type, and generating a response to the request indicating the detected traffic incident.

In Example 37, the subject matter of any one or more of Examples 27-36 optionally include receiving, via an edge system registration application programming interface (API), registration information for the plurality of roadside infrastructure solutions, the registration information including access credentials for each of the roadside infrastructure solutions, wherein the edge service accesses the sensor data via the access credentials.

In Example 38, the subject matter of Example 37 optionally includes accessing, via the access credentials, object detection data stored by at least one of the plurality of roadside infrastructure solutions, wherein the request further defines object type criterion of the transportation dataset, and the curating includes curating the object detection data to meet the defined object type criterion.

Example 39 is an apparatus, comprising: means for receiving, from an edge service, sensor data of a plurality of roadside infrastructure solutions; means for storing the sensor data within a data repository; means for receiving, via a subscriber API a request for a transportation dataset, the request specifying requirements for the transportation dataset, means for curating the sensor data to meet the requirements; and means for providing, in response to the request, the curated sensor data meeting the requirements.

In Example 40, the subject matter of Example 39 optionally includes wherein the curating of the sensor data includes anonymizing the sensor data.

In Example 41, the subject matter of any one or more of Examples 39-40 optionally include wherein the sensor data includes vehicle to everything (V2X) data.

In Example 42, the subject matter of any one or more of Examples 39-41 optionally include means for accessing via the access credentials, object detection data stored by at least one of the plurality of roadside infrastructure solutions; and means for providing the object detection data to the transportation environment data service, wherein the request further defines object type criterion of the transportation dataset, and the curating includes curating the object detection data to meet the defined object type criterion.

In Example 43, the subject matter of any one or more of Examples 39-42 optionally include means for receiving, via a notification API, a request to receive sensor data updates, the request specifying a route of a vehicle; means for receiving, via the notification API, periodic updates indicating a location of the vehicle along the route; means for, in response to a periodic update, searching the data repository for updated sensor data within a predefined distance of the location of the vehicle; means for identifying, based on the searching, updated sensor data; and means for providing the updated sensor data to the vehicle.

In Example 44, the subject matter of Example 43 optionally includes means for providing the updated sensor data from the data repository to a machine learning model; means for obtaining predictions of sensor data during a prospective time period from the machine learning model; and means for providing the predictions of sensor data to the vehicle.

In Example 45, the subject matter of any one or more of Examples 39-44 optionally include wherein the plurality of roadside infrastructure solutions include one or more of a roadside unit, a gantry, a toll booth, a freeway or tollway ramp, a parking structure, a tunnel, or a bridge.

In Example 46, the subject matter of Example 45 optionally includes wherein each of the plurality of roadside infrastructure solutions includes at least one environmental sensor and a stable storage device storing a history of data collected from the environmental sensor, and wherein the edge service accesses the stable storage device to obtain the sensor data.

In Example 47, the subject matter of any one or more of Examples 39-46 optionally include wherein the sensor data includes metadata, the apparatus further comprising: means for analyzing the metadata to confirm the sensor data meets ground truth requirements; means for generating, by the transportation environment data service, ground truth information based on the sensor data; receiving a request, via the subscriber API, for the ground truth information; and means for providing the ground truth information in response to the request.

In Example 48, the subject matter of Example 47 optionally includes means for determining that at least some of sensor data metadata does not meet ground truth requirements, and means for generating ground truth information in response to the determining.

In Example 49, the subject matter of any one or more of Examples 39-48 optionally include means for detecting a traffic incident and a type of the traffic incident based on the sensor data; and means for receiving, from the subscriber API, a request for data indicating incidents of the detected type, and generating a response to the request indicating the detected traffic incident.

In Example 50, the subject matter of any one or more of Examples 39-49 optionally include means for receiving, via an edge system registration application programming interface (API), registration information for the plurality of roadside infrastructure solutions, the registration information including access credentials for each of the roadside infrastructure solutions, wherein the edge service accesses the sensor data via the access credentials.

In Example 51, the subject matter of Example 50 optionally includes means for accessing, via the access credentials, object detection data stored by at least one of the plurality of roadside infrastructure solutions, wherein the request further defines object type criterion of the transportation dataset, and the curating includes curating the object detection data to meet the defined object type criterion.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The invention claimed is:

1. A system, comprising:
a transportation environment data service configured to:
receive, from an edge service, sensor data of a plurality of roadside infrastructure solutions;
store the received sensor data within a data repository;
receive, via a subscriber API, a request for ground truth information, the ground truth information including a transportation dataset, and the request specifying ground truth requirements for the transportation dataset;
generate the ground truth information based on curating the sensor data to meet the ground truth requirements; and
provide, in response to the request, the ground truth information including the curated sensor data meeting the ground truth requirements; and
a supervision entity configured to validate the ground truth information based on one or more other data sources, wherein the transportation environment data service is further configured to determine that at least some of sensor data metadata does not meet ground truth requirements, and generate the ground truth information in response to the determination.

2. The system of claim 1, wherein the transportation environment data service is further configured to:
receive, via a notification API, a request to receive sensor data updates, the request specifying a route of a vehicle;
receive, via the notification API, periodic updates indicating a location of the vehicle along the route;
in response to a periodic update, search the data repository for updated sensor data within a predefined distance of the location of the vehicle;
identify, based on the searching, updated sensor data; and
provide the updated sensor data to the vehicle.

3. The system of claim 2, wherein the transportation environment data service is further configured to:
provide the updated sensor data from the data repository to a machine learning model;
obtain predictions of sensor data during a prospective time period from the machine learning model; and
provide the predictions of sensor data to the vehicle.

4. The system of claim 1, wherein the plurality of roadside infrastructure solutions include one or more of a roadside unit, a gantry, a toll booth, a freeway or tollway ramp, a parking structure, a tunnel, or a bridge.

5. The system of claim 4, wherein each of the plurality of roadside infrastructure solutions includes at least one environmental sensor and a stable storage device storing a history of data collected from the environmental sensor, and wherein the edge service accesses the stable storage device to obtain the sensor data.

6. The system of claim 1, wherein the transportation environment data service is further configured to:
detect a traffic incident and a type of the traffic incident based on the sensor data;
receive, from the subscriber API, a request for data indicating incidents of the detected type; and
generate a response to the request indicating the detected traffic incident.

7. The system of claim 1, wherein the ground truth requirements indicate one or more of a type of sensor that collected the transportation dataset, a weather condition represented by the transportation dataset, a number of vehicles represented by the transportation dataset, a time range represented by the transportation dataset.

8. The system of claim 1, wherein the transportation environment data service is further configured to receive, via an edge system registration application programming interface (API), registration information for the plurality of roadside infrastructure solutions, the registration information including access credentials for each of the roadside infrastructure solutions, wherein the edge service accesses the sensor data via the access credentials.

9. The system of claim 8, wherein the transportation environment data service is further configured to access, via the access credentials, object detection data stored by at least one of the plurality of roadside infrastructure solutions, wherein the request further defines object type criterion of the transportation dataset, and the curating includes curating the object detection data to meet the defined object type criterion.

10. At least one non-transitory computer-readable storage medium comprising instructions that when executed configure hardware processing circuitry to perform operations comprising:
receiving, from an edge service, by a transportation environment data service, sensor data of a plurality of roadside infrastructure solutions;
storing, by the transportation environment data service, the sensor data within a data repository;
receiving, via a subscriber API, by the transportation environment data service, a request for ground truth information, the ground truth information including a transportation dataset, and the request specifying ground truth requirements for the transportation dataset;
generating, by the transportation environment data service, the ground truth information based on curating the sensor data to meet the ground truth requirements;
providing, by the transportation environment data service, in response to the request, the ground truth information including the curated sensor data meeting the ground truth requirements;
validating, by a supervision entity, the ground truth information based on one or more other data sources;
determining, by the transportation environment data service, that at least some of sensor data metadata does not meet ground truth requirements; and
generating, by the transportation environment data service, the ground truth information in response to the determination.

11. The at least one non-transitory computer-readable storage medium of claim 10, wherein the curating of the sensor data includes anonymizing the sensor data.

12. The at least one non-transitory computer-readable storage medium of claim 10, wherein the sensor data includes vehicle to everything (V2X) data.

13. The at least one non-transitory computer-readable storage medium of claim 10, the operations further comprising:
receiving, via a notification API, a request to receive sensor data updates, the request specifying a route of a vehicle;
receiving, via the notification API, periodic updates indicating a location of the vehicle along the route;
in response to a periodic update, searching the data repository for updated sensor data within a predefined distance of the location of the vehicle;
identifying, based on the searching, updated sensor data; and
providing the updated sensor data to the vehicle.

14. The at least one non-transitory computer-readable storage medium of claim 10, wherein the plurality of roadside infrastructure solutions includes one or more of a roadside unit, a gantry, a toll booth, a freeway or tollway ramp, a parking structure, a tunnel, or a bridge.

15. The at least one non-transitory computer-readable storage medium of claim 14, wherein each of the plurality of roadside infrastructure solutions includes at least one environmental sensor and a stable storage device storing a history of data collected from the environmental sensor, and wherein the edge service accesses the stable storage device to obtain the sensor data.

* * * * *